(12) United States Patent
Yang et al.

(10) Patent No.: US 11,100,702 B2
(45) Date of Patent: Aug. 24, 2021

(54) 3D IMAGE LABELING METHOD BASED ON LABELING INFORMATION OF 2D IMAGE AND 3D IMAGE LABELING DEVICE

(71) Applicant: INDUSTRIAL TECHNOLOGY RESEARCH INSTITUTE, Hsinchu (TW)

(72) Inventors: Chung-Hsien Yang, Taipei (TW); Bo-Chun Hsu, Tainan (TW); Chih-Hao Cheng, New Taipei (TW); Po-Sheng Huang, New Taipei (TW); Chih-Hsiang Chan, Tainan (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 0 days.

(21) Appl. No.: 16/728,358

(22) Filed: Dec. 27, 2019

(65) Prior Publication Data
US 2021/0201566 A1    Jul. 1, 2021

(51) Int. Cl.
*G06T 17/00* (2006.01)
*G06K 9/62* (2006.01)
*G06K 9/00* (2006.01)

(52) U.S. Cl.
CPC .......... *G06T 17/00* (2013.01); *G06K 9/00664* (2013.01); *G06K 9/6218* (2013.01)

(58) Field of Classification Search
CPC . G06T 7/30; G06T 11/00; G06T 15/00; G06T 17/00; G06T 2207/10; G06K 9/6218; G06K 9/00664

(Continued)

(56) References Cited

U.S. PATENT DOCUMENTS 10,169,678 B1    1/2019    Sachdeva et al.
10,262,234 B2    4/2019    Li et al.
(Continued)

FOREIGN PATENT DOCUMENTS

CN    106776996 A    5/2017
CN    108572663 A    9/2018
(Continued)

OTHER PUBLICATIONS

Christie et al., "3D Reconstruction of Dynamic Vehicles using Sparse 3D-Laser-Scanner and 2d Image Fusion", 2016 International Conference on Informatics adn Computing (ICIC), 2016, 5 pages.
(Continued)

*Primary Examiner* — Sae Won Yoon
(74) *Attorney, Agent, or Firm* — Birch, Stewart, Kolasch & Birch, LLP

(57) ABSTRACT

A 3D image labeling device and a 3D image labeling method are provided. The 3D image labeling device includes a point cloud cluster module, a projection module, an integration module and a point cloud recovery module. The point cloud cluster module clusters multiple points of a 3D unlabeled image as one or more first point clusters according to a 3D unlabeled image and a cluster algorithm to generate a 3D clustered image. The projection module generates a first 2D image with first objects according to the 3D clustered image, wherein each first point cluster corresponds to one of the first objects. The integration module labels the first objects of the first 2D image according to one or more object frames of a 2D labeled image to generate a second 2D image. The point cloud recovery module generates a 3D labeled image according to the second 2D image.

8 Claims, 2 Drawing Sheets

(58) Field of Classification Search
USPC .......................................................... 345/419
See application file for complete search history.

(56) References Cited

U.S. PATENT DOCUMENTS

| | | | |
|---|---|---|---|
| 10,839,530 B1* | 11/2020 | Berger | G06T 15/08 |
| 2008/0267471 A1* | 10/2008 | Yu | G06K 9/4604 |
| | | | 382/128 |
| 2013/0051658 A1* | 2/2013 | Hwang | G06T 7/187 |
| | | | 382/154 |
| 2013/0125069 A1* | 5/2013 | Bourdev | G06F 3/04845 |
| | | | 715/863 |
| 2014/0010407 A1 | 1/2014 | Sinha et al. | |
| 2017/0220887 A1* | 8/2017 | Fathi | G06K 9/00208 |
| 2018/0260613 A1 | 9/2018 | Gao | |
| 2019/0130219 A1 | 5/2019 | Shreve et al. | |
| 2019/0196015 A1 | 6/2019 | Greiner et al. | |
| 2019/0244046 A1* | 8/2019 | Saft | G06T 7/11 |
| 2019/0355169 A1 | 11/2019 | Sapienza et al. | |
| 2020/0174132 A1* | 6/2020 | Nezhadarya | G06N 3/0454 |

FOREIGN PATENT DOCUMENTS

| | | |
|---|---|---|
| JP | 2019-106034 A | 6/2019 |
| TW | 201005656 A1 | 2/2010 |
| TW | I657407 B | 4/2019 |
| TW | 201937405 A | 9/2019 |
| WO | WO 2018/222756 A1 | 12/2018 |

OTHER PUBLICATIONS

Kim, et al., "Automatic Labeled LiDAR Data Generation and Distance-Based Ensemble Learning for Human Segmentation", IEEE, vol. 7, 2019, pp. 55132-55141 (10 pages).

Monica et al., "Multi-Label Point Cloud Annotation by Selection of Sparse Control Points", 2017 International Conference on 3D Vision (3DV), pp. 301-308 (8 pages).

Ravankar et al., "A Connected Component Labeling Algorithm for Sparse Lidar Data Segmentation", Proceedings of the 6th International Conference on Automation, Robotics and Applications, Feb. 17-19, 2015, pp. 437-442 (6 pages).

Sánchez et al., "Automatic Generation of Labeled 3D Point Clouds of Natural Environments with Gazebo", 978-1-5386-6959-4, IEEE, 2019, pp. 161-166 ( 6 pages).

Wang et al., "Automatic Generation of Synthetic LiDar Point Clouds for 3-D Data Analysis", IEEE Transactions on instrumentation and Measurement, vol. 68, No. 7, Jul. 2019, pp. 2671-2673 (3 pages).

Taiwanese Office Action and Search Report, dated Dec. 16, 2020, for Taiwanese Application No. 109100525.

* cited by examiner

3D IMAGE LABELING METHOD BASED ON LABELING INFORMATION OF 2D IMAGE AND 3D IMAGE LABELING DEVICE

BACKGROUND OF THE INVENTION

Field of the Invention

The invention relates in general to a 3D image labeling method and a 3D image labeling device based on labeling information of 2D image.

Description of the Related Art

Along with the booming development of the auto-pilot industry, the labeling technology of 3D image has drawn great attention. The current 3D image labeling technology still remains at the stage of manual labeling and it is hard to achieve even semi-automation. In comparison to the cost of manually labeling a 2D image, the cost of manually labeling a 3D image is much higher. Therefore, it has become a prominent task for the industries to provide a method or a device capable of labeling 3D image at a lower cost.

SUMMARY OF THE INVENTION

According to one embodiment of the present invention, a 3D image labeling device is disclosed. The 3D image labeling device includes a point cloud cluster module, a projection module, an integration module and a point cloud recovery module. The point cloud cluster module is configured to cluster a plurality of points of a 3D unlabeled image as one or more first point clusters according to a 3D unlabeled image and a cluster algorithm to generate a 3D clustered image. The projection module is configured to generate a first 2D image with one or more first objects according to the 3D clustered image, wherein each of the first point clusters corresponds to one of the first objects. The integration module is configured to label the first objects of the first 2D image according to one or more object frames of one or more 2D labeled images to generate a second 2D image. The point cloud recovery module is configured to generate a 3D labeled image according to the second 2D image.

According to another embodiment of the present invention, a 3D image labeling method is disclosed. When the 3D image labeling method is executed by a processor, the processor is enabled to: execute a point cloud cluster module to cluster a plurality of points of the 3D unlabeled image as one or more first point clusters according to a 3D unlabeled image and a cluster algorithm to generate a 3D clustered image; execute a projection module to generate a first 2D image with one or more first objects according to the 3D clustered image, wherein each of the first point clusters corresponds to one of the one or more first objects; execute an integration module to label the one or more first objects of the first 2D image according to one or more object frames of one or more 2D labeled images to generate a second 2D image; and execute a point cloud recovery module to generate a 3D labeled image according to the second 2D image.

The above and other aspects of the invention will become better understood with regard to the following detailed description of the preferred but non-limiting embodiment(s). The following description is made with reference to the accompanying drawings.

DETAILED DESCRIPTION OF THE INVENTION

To simplify the description of the invention, hereinafter the terms "three-dimensional" and "two-dimensional" are referred as "3D" and "2D" respectively.

According to the current technologies, the 2D image converted from a 3D image through projection cannot be automatically or semi-automatically labeled using existing labeling software or artificial intelligence. On the other hand, the depth relation between a front object and a rear object of the 3D image will disappear when the 3D image is converted into a 2D image (for example, the rear object is covered by the front object). Suppose the object frame of a 2D image labeled according to an original 2D image is directly used to label the 2D image converted from a 3D image. If the labeled 2D image is then converted to a 3D image, the labeling will be confused because the point clouds corresponding to the front object cannot be differentiated form the point clouds corresponding to the rear object. The 3D image labeling device and the 3D image labeling method disclosed in the present invention can resolve the above problems.

Figure 1:
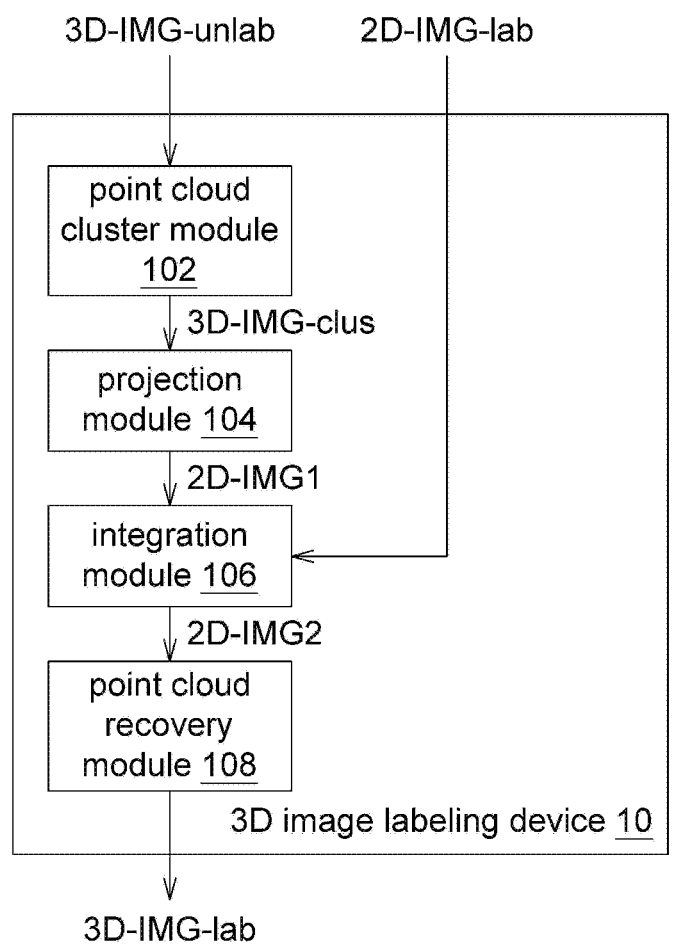
FIG. 1 is a block diagram of a 3D image labeling device based on 2D image labeling information according to an embodiment of the present invention.

Referring to FIG. 1, a block diagram of a 3D image labeling device based on 2D image labeling information according to an embodiment of the present invention is shown. The 3D image labeling device 10 includes a point cloud cluster module 102, a projection module 104, an integration module 106 and a point cloud recovery module 108.

In an embodiment, the point cloud cluster module 102, the projection module 104, the integration module 106 and the point cloud recovery module 108 can be realized by a combination of computer readable commands and can be stored in a non-transitory memory (not illustrated) of the 3D image labeling device 10. When the computer readable commands configured to realize the point cloud cluster module 102, the projection module 104, the integration module 106 and the point cloud recovery module 108 are executed by a processing unit (not illustrated), the processing unit is enabled to perform the functions of the point cloud cluster module 102, the projection module 104, the integration module 106 and the point cloud recovery module 108.

The point cloud cluster module 102 is configured to receive a 3D unlabeled image 3D-IMG-unlab and to cluster a plurality of points of a 3D unlabeled image 3D-IMG-unlab as one or more first point clusters according to a cluster algorithm to generate a 3D clustered image 3D-IMG-clus.

The projection module 104 is configured to project the first point clusters of the 3D clustered image 3D-IMG-clus to a 2D plane to generate a first 2D image 2D-IMG1.

The integration module 106 is configured to receive the first 2D image 2D-IMG1 and one or more 2D labeled images 2D-IMG-lab and to generate a second 2D image 2D-IMG2 according to the first 2D image 2D-IMG1 and 2D labeled image 2D-IMG-lab.

The point cloud recovery module 108 is configured to generate a 3D labeled image 3D-IMG-lab according to the second 2D image 2D-IMG2.

Figure 2:
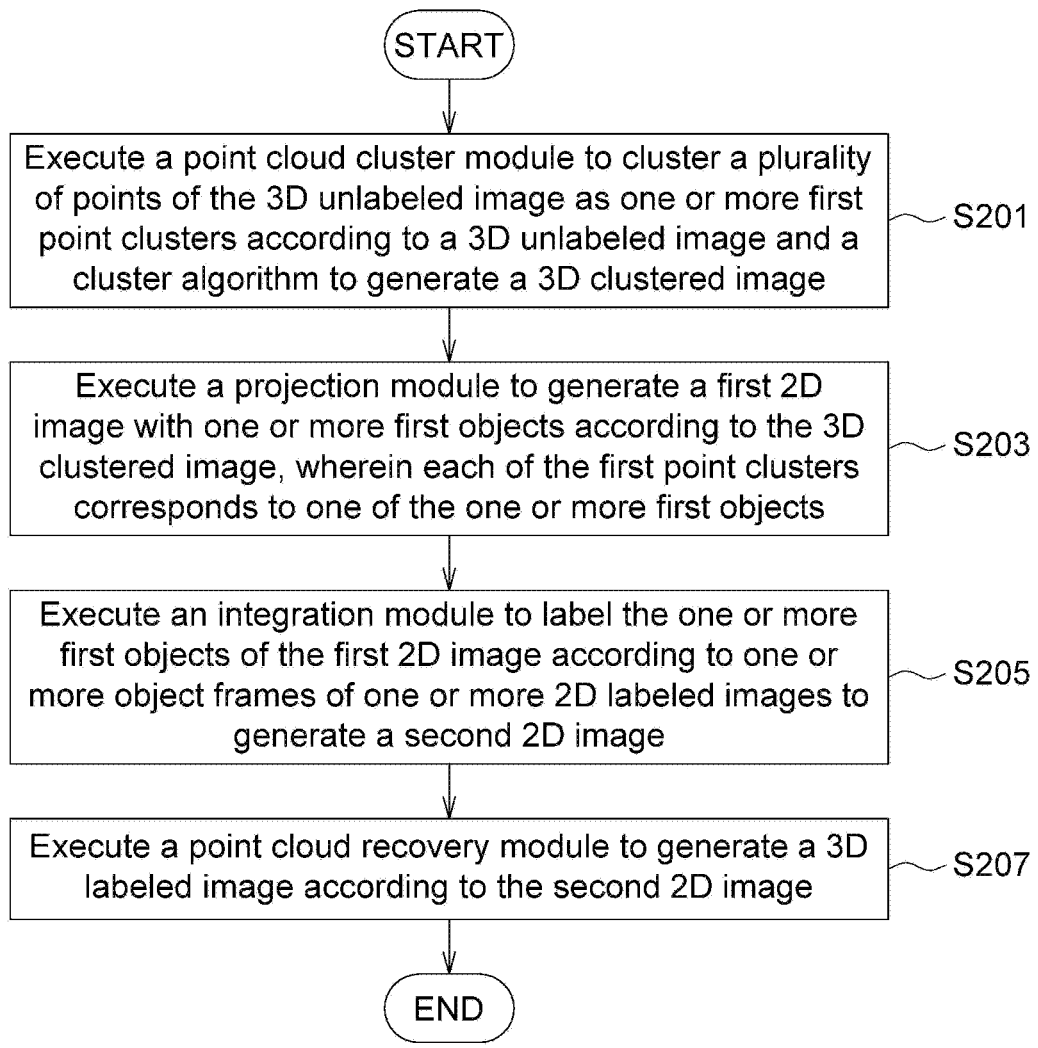
FIG. 2 is a flowchart of an image labeling method based on 2D image labeling information according to an embodiment of the present invention.

Refer to FIG. 2, a flowchart of an image labeling method based on 2D image labeling information according to an embodiment of the present invention, to gain a better understanding of the invention. The 3D image labeling method can be used in the 3D image labeling device 10 and can be executed by a processing unit.

Firstly, the method begins at step S201, a point cloud cluster module is executed to receive a 3D unlabeled image and to cluster a plurality of points of a 3D unlabeled image 3D-IMG-unlab as one or more first point clusters according to a cluster algorithm to generate a 3D clustered image 3D-IMG-clus. In an embodiment, the 3D unlabeled image 3D-IMG-unlab can be obtained from a 3D original image database. In another embodiment, the 3D unlabeled image 3D-IMG-unlab can be obtained by one or more 3D cameras, such as a light detection and ranging (LiDAR) radar or a radar. If the 3D unlabeled image 3D-IMG-unlab is obtained from multiple 3D cameras, a 3D unlabeled image 3D-IMG-unlab corresponding to a specific time and a specific space can be generated from the 3D original image captured by the 3D cameras through time and space alignment, and the 3D unlabeled image 3D-IMG-unlab is further provided to the point cloud cluster module 102. In an embodiment, each point may contain space information (for example, 3D coordinates). In another embodiment, each point may contain space information and color information (for example, the RGB values). In an embodiment, the cluster algorithm used in the present invention can be an algorithm commonly used in the present technology field, such as a cluster algorithm based on the distance between the points. In another embodiment, the cluster algorithm used in the present invention can be a cluster algorithm based on the density of the points. Among the clustered points, the cluster algorithm based on the density of the points can effectively differentiate the part of the clustered points belonging to the front object (the object closer to the camera) from the part of the clustered points belonging to the rear object (the object farther away from the camera) and can allocate the two parts of points to distinct first point clusters. Each of the first point clusters may include one or more points. In an embodiment, each of the first point clusters may represent an object. In another embodiment, each of the first point clusters may represent one of the multiple pieces of an actual object. For example, the three first point clusters may respectively represent the head, the upper body and the lower body of a person (the three pieces of an actual object). When the three first point clusters are combined together, the three first point clusters may represent an actual object, such as a person.

In step S203, a projection module is executed to project the first point clusters of the 3D clustered image 3D-IMG-clu to a 2D plane to generate a first 2D image 2D-IMG1. In an embodiment, the projection module 104 can generate a first 2D image 2D-IMG1 using the near-point spherical projection method. In another embodiment, the projection module 104 can generate the first 2D image 2D-IMG1 using a projection method commonly used in the present technology field. The first 2D image 2D-IMG1 includes one or more first objects formed from the projection of the first point clusters of the 3D clustered image 3D-IMG-clus. That is, the first 2D image 2D-IMG1 generated by the projection module is a 2D image with 3D information.

In step S205, an integration module is executed to generate a second 2D image 2D-IMG2 according to the first 2D image 2D-IMG1 and one or more 2D labeled images 2D-IMG-lab. The 2D labeled image 2D-IMG-lab and the 3D unlabeled image 3D-IMG-unlab correspond to the same specific time and the same specific space. In an embodiment, the 2D labeled image 2D-IMG-lab are obtained from a 2D labeled image database. In another embodiment, the 2D labeled image 2D-IMG-lab is obtained from one or more 2D camera. If the 2D labeled image 2D-IMG-lab is obtained from multiple 2D cameras, the 2D images captured by the 2D cameras at different angles (such as 30°, 60° and 120°) are further calibrated and labeled to generate a 2D labeled image 2D-IMG-lab. Then, the 2D labeled image 2D-IMG-lab is provided to the integration module 106. Each of the 2D labeled images 2D-IMG-lab may include one or more object frames. Each of the object frames has an object category, such as "person", "car" or "motor bike". The integration module 106 labels the first 2D image 2D-IMG1 according to the object frames of the 2D labeled images 2D-IMG-lab to generate a second 2D image 2D-IMG2. In an embodiment, for each of the first objects of the first 2D image 2D-IMG1, the integration module 106 determines whether the first objects fall within a range corresponding to one of the object frames of the labeled image 2D-IMG-lab. If the determination is affirmative, then the first object is labeled according to the category of the corresponding object frame; otherwise, the first object is not labeled, and the second 2D image is generated. Through the above method, an object category can be determined for each of the first objects of the first 2D image 2D-IMG1 corresponding to the object frames of the labeled image 2D-IMG-lab. That is, in the second 2D image 2D-IMG2, the object category of each of the first objects corresponding to the object frames of the labeled image 2D-IMG-lab is the same as that of the object frames of the corresponding labeled image 2D-IMG-lab, and the first objects not corresponding to the object frames of the labeled image 2D-IMG-lab are still not allocated to any object category.

In step S207, a point cloud recovery module is executed to generate a 3D labeled image 3D-IMG-lab according to the second 2D image 2D-IMG2. In an embodiment, for each of the first objects of the second 2D image 2D-IMG2, the point cloud recovery module 108 labels all points of the first point clusters of the 3D clustered image 3D-IMG-clus corresponding to the first object according to the object category (if exists) of the first object to generate a 3D labeled image 3D-IMG-lab.

In an embodiment, a manually assisted labeling step is interposed between step S205 and step S207. In the manually assisted labeling step, the first object of the first 2D image 2D-IMG1 not corresponding to the object frames of the labeled image 2D-IMG-lab can be labeled to reduce the number of unlabeled first object of the second 2D image 2D-IMG.

According to the 3D image labeling device and the 3D image labeling method disclosed in the present invention, before a 3D unlabeled image is converted to a first 2D image through projection, the point cloud cluster module clusters the points of the 3D unlabeled image to generate a 3D clustered image. Each of the first point clusters of the 3D clustered image corresponds to a first object of the first 2D image. Position relations between the first point clusters are maintained through the correspondence between the first point clusters and the first objects. Then, the first object of the first 2D image is labeled according to the object frames of the 2D labeled images to generate a second 2D image. The first object of the second 2D image is labeled and allocated to an object category. Then, the object category of the first object of the second 2D image is applied to all points of the 3D clustered image corresponding to the first point cluster. Thus, the labeled 3D image generated according to the above method will be free of the problem of lacking the depth relation between the front object and the rear object when the 3D points are projected.

In a practical application, the 3D image labeling device and the 3D image labeling method disclosed in the present invention can be configured to create a 3D labeled image database according to a 2D labeled image database and a 3D unlabeled image database. In another practical application, the 3D image labeling device and the 3D image labeling method disclosed in the present invention can be disposed in an auto-pilot vehicle to instantly label the 3D images provided by a 3D camera by instantly labeling the 2D image provided by a 2D camera.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A 3D image labeling device, comprising:
a processor; and
a memory, configured to store a point cloud cluster module, a projection module, an integration module and a point cloud recovery module;
wherein the point cloud cluster module, when executed by the processor, causes the processor to cluster a plurality of points of a 3D unlabeled image as one or more first point clusters according to the 3D unlabeled image and a cluster algorithm to generate a 3D clustered image;
wherein the projection module, when executed by the processor, causes the processor configured to generate a first 2D image with one or more first objects according to the 3D clustered image, wherein each of the one or more first point clusters corresponds to one of the one or more first objects;
wherein the integration module, when executed by the processor, causes the processor to label the one or more first objects of the first 2D image according to one or more object frames of one or more 2D labeled images to generate a second 2D image where capture time associated with the first 2D image is same as capture time associated with the one or more 2D labeled images, and the labeling of the one or more first objects of the first 2D image according to one or more object frames of one or more 2D labeled images to generate the second 2D image includes:
for each of the one or more first objects of the first 2D image, determine whether a respective object of the one or more first objects falls within a range of space corresponding to one of the one or more object frames of the one or more 2D labeled images, wherein when the determination is affirmative, the respective object is labeled according to a category of the corresponding object frame; otherwise, the respective object is not labeled, and the second 2D image is generated;
wherein the point cloud recovery module, when executed by the processor, causes the processor to generate a 3D labeled image according to the second 2D image.

2. The 3D image labeling device according to claim 1, wherein the cluster algorithm is based on a density of the plurality of points of the 3D unlabeled image.

3. The 3D image labeling device according to claim 1, wherein for each of a plurality of objects of the second 2D image with a respective object category, the point cloud recovery module, when executed by the processor, further causes the processor to label all points of the 3D clustered image corresponding to the one or more first point clusters of a respective object of the one or more first objects according to the respective object category of each of the plurality of objects of the second 2D image.

4. The 3D image labeling device according to claim 1, wherein each of the one or more first point clusters corresponds to a piece of an actual object.

5. A 3D image labeling method, comprising the steps of:
executing, by a processor, a point cloud cluster module to cluster a plurality of points of a 3D unlabeled image as one or more first point clusters according to the 3D unlabeled image and a cluster algorithm to generate a 3D clustered image;
executing, by a processor, a projection module to generate a first 2D image with one or more first objects according to the 3D clustered image, wherein each of the one or more first point clusters corresponds to one of the one or more first objects;
executing, by a processor, an integration module to label the one or more first objects of the first 2D image according to one or more object frames of one or more 2D labeled images to generate a second 2D image where capture time associated with the first 2D image is same as capture time associated with the one or more 2D labeled images, wherein the labeling of the one or more first objects of the first 2D image according to one or more object frames of one or more 2D labeled images to generate the second 2D image includes:
for each of the one or more first objects of the first 2D image, determine whether a respective object of the one or more first objects falls within a range of space corresponding to one of the one or more object frames of the one or more 2D labeled images, wherein when the determination is affirmative, the respective object is labeled according to a category of the corresponding object frame; otherwise, the respective object is not labeled, and the second 2D image is generated; and
executing, by a processor, a point cloud recovery module to generate a 3D labeled image according to the second 2D image.

6. The 3D image labeling method according to claim 5, wherein the cluster algorithm is based on a density of the plurality of points of the 3D unlabeled image.

7. The 3D image labeling method according to claim 5, wherein the method comprising further steps of:
executing, by a processor, the point cloud recovery module to, for each of a plurality of objects of the second 2D image with a respective object category, label all points of the 3D clustered image corresponding to the one or more first point clusters of a respective object of the one or more first objects according to the respective object category of each of the plurality of objects of the second 2D image.

8. The 3D image labeling method according to claim 5, wherein each of the one or more first point clusters corresponds to a piece of an actual object.

* * * * *